2,926,147
COMPOSITION CONTAINING POLYESTER, ORGANIC POLYISOCYANATE, TERTIARY AMINE SALT AND ALKALI METAL CARBONATE AND PROCESS OF PREPARING FOAM THEREFROM

George Rappaport, Joseph A. Szaruga, and James R. Wall, Dayton, Ohio, assignors to General Motors Corporation, Detroit, Mich., a corporation of Delaware No Drawing. Application July 14, 1958
Serial No. 748,142
2 Claims. (Cl. 260—2.5)

This invention relates to foam and is particularly directed to foamed products made by reactions involving an isocyanate compound as one of the main reactants.

Foamed reaction products made by reacting polyisocyanates and polyesters have become increasingly important during the last few years and have, in many cases, been substituted for foamed rubber parts. One drawback to isocyanate reaction products is the rapidity with which the reaction between the polyisocyanate and the polyester progresses after the mixture is made. In other words, as soon as the various ingredients for the reaction have been mixed, foaming and polymerization progress so quickly that it is often difficult to dispose the reaction mixture in a suitable mold or molds. Furthermore, due to the rapid reaction, it has been difficult in the past to proceed with normal production practices in the intermittent filling of molds, etc.

In copending application S.N. 449,019, assigned to the assignee of the present invention and now abandoned, a method of control is set forth whereby a delay in reaction may be obtained. In this application, the control is accomplished by reduction in the temperature of the ingredients prior to mixing and the storing of the reaction mixture at a temperature in the order of $-10°$ F. and below wherein foaming and polymerization progress as the reaction mixture is warmed up.

It is, therefore, the basic object of this invention to provide a method for making a foam wherein a polyisocyanate compound is mixed with another material, such as a polyester at room temperature, and wherein the reaction is controlled so that the foaming and polymerization steps may be initiated at a time subsequent to the mixing.

In carrying out this object, it is a further object to provide a method whereby the initiation of the reaction between the several ingredients is controlled and the complete mixture of the component materials used in the reaction may be accomplished at room temperature and wherein the reaction mixture may then be stored for an appreciable period of time and, finally, at the time desired, the reaction may be initiated through application of heat.

Another object of the invention is to provide a polyisocyanate-polyester reaction product wherein the catalyst for the polymerization portion of the reaction and the water for the forming part of the reaction are provided from heat sensitive materials whereby the reaction mixture may be fully compounded and finally the reaction may be initiated as desired by elevating the temperature of the reaction mixture.

A still further object of the invention is to provide a heat sensitive catalyst for use in polyisocyanate-polyester reaction mixtures and a heat sensitive water releasing material whereby the catalyst is substantially inactive to initiate polymerization reactions until a predetermined elevated temperature is imposed upon the system and wherein the water liberating material does not provide any free water in the reaction mixture until an elevated temperature of predetermined range is reached.

In this manner, it is possible to formulate the entire recipe for the reaction mixture and to store said mixture for an appreciable period at room temperature and wherein predetermined portions of said reaction mixture may be subsequently placed in a mold and may be finally reacted by elevating the temperature to a predetermined temperature whereby the catalyst becomes active to initiate the polymerization reaction while the water liberating agent releases free water to cause the foaming reaction to take place, said heat sensitive materials being made reactive substantially concurrently within a predetermined elevated range of temperature.

In carrying out the above objects, it is a further object of the invention to utilize a catalyst such as a N-ethyl morpholine hydrochloride in combination with a hydrated salt as a source of water, said hydrochloride and said hydrated salt both being heat sensitive within substantially the same temperature range and being substantially inactive to initiate any reaction until a predetermined elevated temperature, well above room temperature, is reached. In this connection, the N-ethyl morpholine hydrochloride, upon approaching a temperature in the order of 250° F., is believed to break down into hydrochloric acid and N-methyl morpholine, which itself is a catalyst for the polymerization reaction between a diisocyanate, for example, toluene diisocyanate, and a polyester such as an alkyd resin.

Among the organic polyisocyanates which may be used are: propylene-1,2-diisocyanate, butylene-1,3-diisocyanate, hexylene-1,6-diisocyanate, M-phenylene diisocyanate, 2,4 toluene diisocyanate, 1,6 toluene diisocyanate, 1,5 naphthalene diisocyanate and blends of the above, for example, 80%–20% by weight of 2.4 toluene diisocyanate and 2,6 toluene diisocyanate or a 65%–35% blend by weight of 2,4 and 2,6 toluene diisocyanate, etc.

Useful polyesters which may be incorporated in the reaction include alkyd resins which are defined for the purposes of this invention as the reaction products between polybasic acids and polyhydroxy alcohols, for example, wherein the dibasic acid may be adipic acid, sebacic acid, phthalic acid, malonic acid, succinnic acid, maleic acid, etc., and wherein the polyhydroxy alcohol may be ethylene glycol, diethylene glycol, trimethylene glycol, glycerol, sorbitol, propylene glycol, dripropylene glycol, trimethylolethane, trimethylolpropane and mixtures thereof, etc.

In place of N-ethyl morpholine hydrochloride, N-phenyl morpholine hydrochloride or N-methyl morpholine hydrochloride may be used under similar control conditions.

A hydrate such as sodium carbonate ($10H_2O$) is preferred as the water releasing agent since this hydrate releases its water of hydration within the same range of temperature, for example, up to 250° F. This hydrate has the further advantage of leaving a residue of sodium carbonate which has the dual function of acting as a neutralizing agent for the free hydrochloric acid and as an added source of carbon dioxide. The water liberated enters the reaction to cause the foaming of the mixture simultaneously as the polymerization reaction progresses whereby a foam is formed.

It is understood that any other suitable hydrate may be used, however, we prefer to use salt of carbonic acid having an alkaline reaction so as to neutralize any free hydrochloric acid in the mixture. Sodium potassium carbonate ($6H_2O$), sodium carbonate ($7H_2O$), potassium carbonate ($2H_2O$), etc., are all useful for this purpose. It has been found that the salt contamination caused by the hydrate in the mixture is not deleterious to the final product in any way. Furthermore, the carbonates, upon reaction with hydrochloric acid form carbon dioxide gas which aids the foaming of the reaction mixture.

The invention may be specifically illustrated but not limited by the following examples.

Example 1

A mixture of 100 parts by weight of a polyester prepared from 16 mols of adipic acid, 16 mols of diethylene glycol, and 1 mol of trimethylol propane and having an acid number of 1.5 maximum and an hydroxyl number of 60 is placed in a tank with 18.2 parts by weight of toluene diisocyanate, 4 parts by weight of sodium carbonate ($10H_2O$), 1.4 parts by weight of an emulsifier, 3.5 parts by weight of N-ethyl morpholine hydrochloride. These ingredients are mixed thoroughly at room temperature in the tank by using a standard paddle type mixer and may then be stored in the mixed condition at room temperature, preferably at about 60° F. plus or minus 10° F. under anhydrous conditions. When it is desired to form a foam product, a desired quantity of this reaction mixture is placed in a mold having the desired shape and size and the mold is heated to a temperature of about 250° F. and maintained at said temperature for a period in the order of 30 minutes. During this time, the morpholine hydrochloride becomes active as a catalyst and liberates its hydrochloric acid while the hydrated sodium carbonate releases water to initiate the foaming reaction and substantially simultaneously the sodium carbonate remaining neutralizes the free hydrochloric acid released by the N-ethyl morpholine hydrochloride. At the end of the heating period, a flexible foam having the desired shape is present in the mold and may be removed therefrom.

Example 2

A mixture of 100 parts by weight of a polyester prepared from 8 mols of sebacic acid, 8 mols of adipic acid, and one-half mol of trimethylol propane having an acid number of 5 maximum and an hydroxyl number of from 60 to 80 is charged into a tank and is mixed at room temperature with 25 parts by weight of toluene diisocyanate, 8 parts by weight of sodium carbonate ($10H_2O$), 7 parts by weight of N-phenyl morpholine hydrochloride and 2 parts by weight of an emulsifier. This mixture may be stored at room temperature, preferably 60° F. plus or minus 10° F. under anhydrous conditions. When it is desired to form a foam product, suitable quantities of this mixture are reacted in a mold at temperatures of 250° F. as set forth in connection with Example 1 to form a flexible foam.

Example 3

A mixture of 100 parts by weight of a polyester prepared from 8 mols of adipic acid, 8 mols of sebacic acid, 16 mols of ethylene glycol and 1 mol of trimethylol propane having an acid number of 3 maximum and an hydroxyl number of from 60 to 69, is charged into a tank together with 16 parts by weight of a diisocyanate blend made up of 80% by weight of 2,4 toluene diisocyanate and 20% by weight of 2,6 toluene diisocyanate, 3 parts by weight of N-methyl morpholine hydrochloride, 6 parts of sodium potassium carbonate ($6H_2O$), and 1 part of an emulsifier are thoroughly mixed at room temperature with a standard paddle type mixer and may then be stored in mixed condition at room temperature, preferably 60° F. plus or minus 10° F. under anhydrous conditions. When it is desired to form a flexible foam product from this mixture, a desired quantity is charged into a mold and is heated as set forth in connection with Example 1 to form a flexible foam having the desired shape.

In all of the foregoing examples, the emulsifier used was an ethylene oxide condensation product of stearic acid. Other emulsifiers of this same general class, such as those derived from lauric or palmitic acid, are also useful as well as commercial emulsifiers such as alkylaryl sulfonates or dioctylsulfosodium succinnate, etc. In some cases, the emulsifier may be left out but is preferred since it facilitates mixing of the reactants.

It is apparent that, in all of the foregoing examples, the mold may be initially heated prior to the introduction of the reaction mixture therein and that, in most cases, this will reduce the period of heating. However, this alternative is entirely a matter of choice.

In all instances, the preparation of the polyester is carried out by reacting the specific ingredients such as the polybasic acid and the polyhydroxy alcohol by placing the ingredients in the proportions set forth in an open kettle and reacting the ingredients at temperatures above 212° F., preferably about 220° F., whereby the water reaction may be eliminated, as desired. The processing is controlled to yield acid and hydroxyl numbers within the ranges noted as is well known in the art. Of course, other conventional preparatory processes for making the polyesters may be used, if desired, although the foregoing is one of the most simple ways of preparing the polyester from its starting ingredients.

In concurrently filed application S.N. 748,140, we have disclosed an alternative method for controlling the reaction of the specific ingredients. In our concurrently filed application, the catalyst is formed in situ rather than being present as an inactive ingredient at room temperature. In the case of the formation of the catalyst in situ, we have found that reactants may be used in the original reaction mixture which will form the desired catalyst at the elevated temperature.

While the embodiments of the present invention as herein disclosed constitute preferred forms, it is to be understood that other forms might be adopted.

What is claimed is as follows:

1. In a method for producing foamed products through substantially concurrent polymerization and foaming reactions between an organic polyisocyanate and a polyester, the steps of; mixing at room temperature from 16 to 25 parts by weight of an organic polyisocyanate with 100 parts by weight of a polyester which is a reaction product of a dicarboxylic acid and a polyhydric alcohol having an acid number not over 5 and a hydroxyl number not less than 60 together with from 3 to 7 parts by weight of an anhydrous catalyst source compound taken from the class consisting of N-phenyl, N-methyl and N-ethyl morpholine hydrochloride, together with 4 to 8 parts by weight of an alkali metal carbonate hydrate, heating said mixture to a temperature above room temperature and not in excess of 250° F. for a time sufficient to cause the morpholine hydrochloride to liberate its hydrochloric acid and subsequently for the residual catalytic morpholine compound to initiate the polymerization reaction between the polyisocyanate and the polyester, and to substantially concurrently cause the hydrated carbonate to release water of hydration to cause the foaming reaction to progress and simultaneously neutralize at least a portion of said liberated hydrochloric acid.

2. A reaction mixture for subsequent use in the production of foamed products, said reaction mixture being substantially nonreactive at room temperature and being reactive at temperatures in excess of room temperature and not above 250° F. for forming a foam, said mixture comprising 16 to 25 parts by weight of an organic polyisocyanate, 100 parts by weight of a polyester which is a reaction product of a dicarboxylic acid and a polyhydric alcohol having an acid number not over 5 and a hydroxyl number not less than 60, 3 to 7 parts by weight of a heat sensitive, anhydrous catalytic material taken from the class consisting of N-ethyl, N-methyl, and N-phenyl morpholine hydrochloride together with 4 to 8 parts by weight of an hydrated alkali metal carbonate.

References Cited in the file of this patent

UNITED STATES PATENTS 2,577,279    Simon et al.   ----------- Dec. 4, 1951
2,842,506    Roussel   ---------------- July 8, 1958